UNITED STATES PATENT OFFICE.

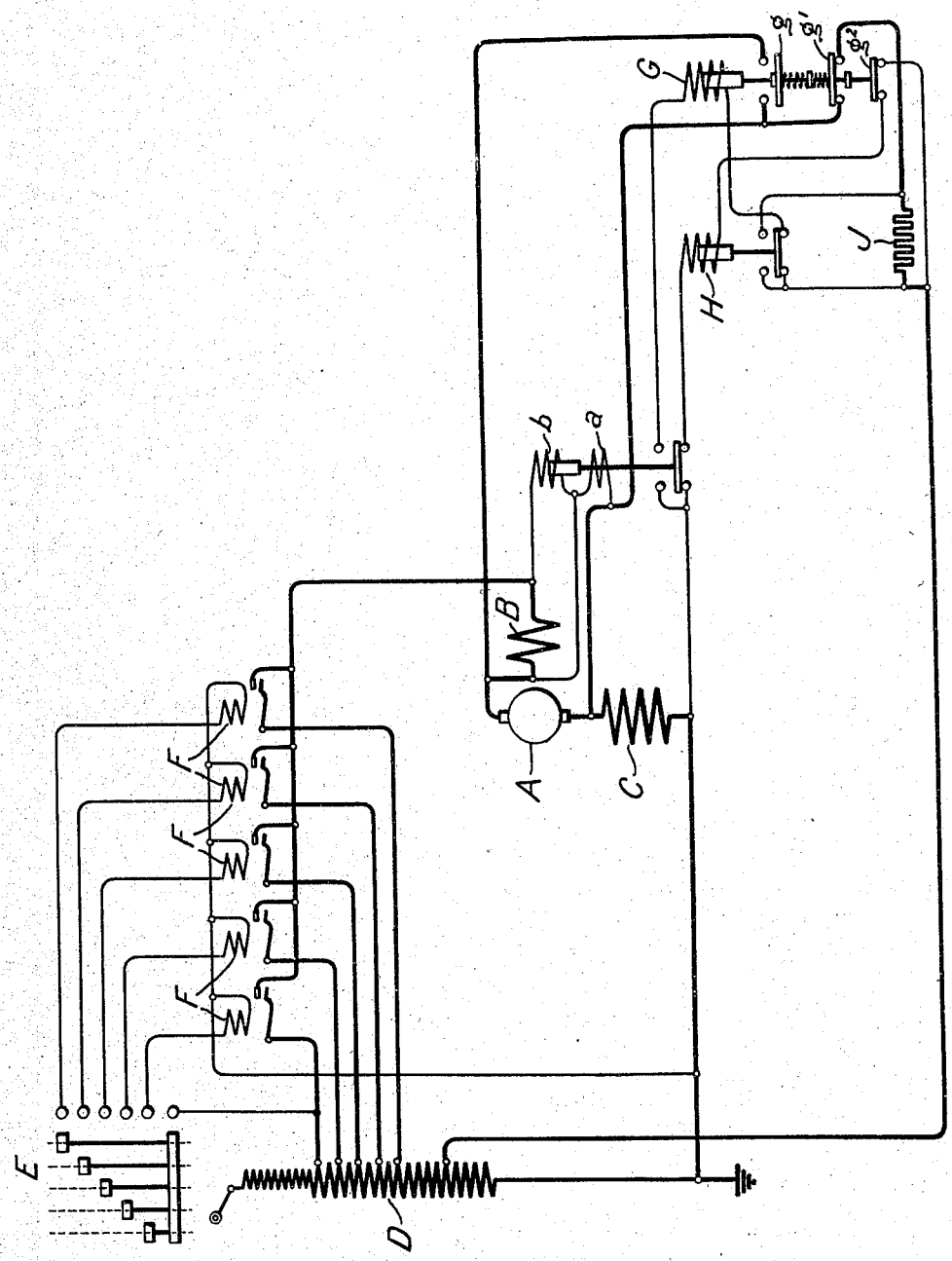

WILLIAM B. POTTER, OF SCHENECTADY, NEW YORK, ASSIGNOR TO GENERAL ELECTRIC COMPANY, A CORPORATION OF NEW YORK.

ALTERNATING-CURRENT-MOTOR CONTROL.

1,041,868.  Specification of Letters Patent.  Patented Oct. 22, 1912.

Application filed April 2, 1910. Serial No. 552,941.

*To all whom it may concern:*

Be it known that I, WILLIAM B. POTTER, a citizen of the United States, residing at Schenectady, county of Schenectady, State of New York, have invented certain new and useful Improvements in Alternating-Current-Motor Control, of which the following is a specification.

My invention relates to the control of alternating current motors of the compensated series type, that is, to motors having an armature provided with commutator brushes, an exciting winding on the stator producing a magnetization at right angles to the line of the brushes, and a compensating or inducing winding on the stator producing a magnetization in line with the armature brushes; and its object is to provide a novel and simple control system such that the connections of the motor are automatically varied to produce the best commutation at different speeds.

It has been proposed heretofore to operate a motor of this type as a repulsion motor, that is, with the armature brushes short-circuited, at starting, and for high speeds to open the short-circuit and impress a shunt excitation on the compensating winding.

My invention consists in rendering this change of connections wholly automatic by providing circuit-changing means wholly independent of the manual control but responsive to speed variation in the motor. With such an arrangement, the manual control consists simply of switches for varying the voltage impressed on the motor to control its speed, while the change in motor connections is made automatically at the proper time to give best commutation for both low and high speeds.

My invention will best be understood by reference to the accompanying drawing which shows diagrammatically a motor control system arranged in accordance with my invention.

In the drawing, A represents the armature, B the exciting winding, and C the compensating or inducing winding of an alternating current motor.

D represents a transformer winding serving as a source of current for the motor.

E represents a manually operated controlling switch which is indicated diagrammatically with its contacts developed on a plane surface. This switch controls the windings of contactors F, F which serve to connect the motor to different points on the transformer winding D and thereby to vary the impressed voltage to control the motor speed.

The motor connections are controlled by means of a relay device having a main winding $b$ connected in shunt to the exciting winding B and an opposing winding $a$ connected in shunt to the armature A. The contacts of this relay device control a pair of relays G and H which have contacts arranged as shown.

J represents a resistance which is used in the transition from one set of motor connections to the other.

At starting the switch E is moved into its first position, energizing the right hand contactor F which connects the motor to the transformer tap of lowest voltage. At starting the voltage drop in the armature A is comparatively low and that in the exciting winding B is comparatively high. The main winding $b$ of the relay device is, consequently, strongly energized and pulls up the plunger, moving the contact to the other position than that shown. A circuit is thereby closed from the lower terminal of transformer D, through the upper contacts of the relay device, the winding of relay G and the lower contacts of relay H to the transformer winding. Relay G is, therefore, energized and pulls up its contacts, short-circuiting the motor armature brushes through its upper contact $g$. The motor, consequently, starts as a repulsion motor with the brushes of the armature short-circuited. As switch E is moved to its other positions the voltage impressed on the motor is gradually increased and the motor is accelerated. As the motor speed increases, the motor current decreases and the voltage drop in exciting winding B decreases. Consequently, winding $b$ of the relay device is weakened until at a predetermined speed it no longer is able to hold up the plunger. The contact of the device falls, breaking the circuit of relay G which, therefore, drops its contact. The contacts $g$ and $g^1$ are yieldingly mounted as indicated, so that contact $g^1$ closes before contact $g$ opens. When contact $g^1$ closes, a circuit is established from the junction of compensating winding C and motor armature A through contact $g^1$, the resistance J to an intermediate point on the transformer winding D. Next, contact $g$ opens the short-circuit from armature A. Then, contact $g^2$ closes, closing a circuit through the winding of relay H. This relay, therefore, pulls up its contact and short-circuits resistance J. A shunt excitation is thus impressed directly on winding C from the transformer.

Winding $a$ serves merely to hold the plunger down after it has been released by winding $b$ and after contact $g$ has opened. Thus, this winding serves to prevent any tendency to chattering in the relay device.

Of course if the speed of the motor should be decreased and the current increased sufficiently to enable winding $b$ to overpower winding $a$, the relay would operate to short-circuit the motor armature brushes precisely as at starting when the speed is zero.

By my invention as above described the change in connections of the motor is made wholly automatic and entirely independent of the manual control.

Although for the sake of simplicity I have shown only one motor in the drawing, it is obvious that any number of motors may be simultaneously controlled in the manner described for the one motor.

I do not desire to limit myself to the particular connections and arrangement of parts shown and described, but aim, in the appended claims, to cover all modifications which are within the scope of my invention.

What I claim as new and desire to secure by Letters Patent of the United States, is,—

1. In combination with an alternating current motor of the commutator type and a source of current therefor, manually controlled means for connecting said motor to said source and for varying the motor speed, and automatic means, independent of the manual control and responsive to variation in the electrical condition of a winding of the motor, for short-circuiting the motor armature brushes at low speeds and opening the short-circuit at high speeds.

2. In combination with an alternating current motor of the commutator type provided with brushes and a source of current therefor, manually controlled means for connecting the motor to the source and varying the motor speed, a relay having a winding connected in parallel with a winding of the motor, the voltage of which varies with the motor speed, and connections controlled solely by said relay, independently of the manual control, for short-circuiting the motor armature brushes.

3. In combination with an alternating current motor of the compensated series type and a source of current therefor, manually controlled means for connecting the motor to the source and varying the motor speed, and automatic means, independent of the manual control and responsive to variation in the motor speed, for short-circuiting the motor armature brushes at low speeds and opening the short-circuit and impressing a shunt voltage on the compensating winding at high speeds.

4. In combination with an alternating current motor of the compensated series type and a source of current therefor, manually controlled means for connecting the motor to the source and varying the motor speed, a relay having a winding connected in parallel with a winding of the motor, the voltage of which varies with the motor speed, and connections controlled solely by said relay, independently of the manual control, for short-circuiting the motor armature brushes when the relay contacts are in one position and opening the short-circuit and impressing a shunt voltage on the compensating winding when the relay contacts are in their other position.

5. In combination with an alternating current motor of the compensated series type and a source of current therefor, manually controlled means for connecting the motor to the source and varying the motor speed, a relay having a main winding connected in parallel with the exciting winding of the motor and an opposing winding connected in parallel with the motor armature, and connections controlled solely by said relay, independently of the manual control, for short-circuiting the motor armature brushes.

In witness whereof, I have hereunto set my hand this 1st day of April, 1910.

WILLIAM B. POTTER.

Witnesses:
BENJAMIN B. HULL,
HELEN ORFORD.

Copies of this patent may be obtained for five cents each, by addressing the "Commissioner of Patents, Washington, D. C."